United States Patent
Kurata et al.

(10) Patent No.: US 10,550,289 B2
(45) Date of Patent: Feb. 4, 2020

(54) PRESSURE SENSITIVE ADHESIVE SHEET (71) Applicant: LINTEC CORPORATION, Tokyo (JP)

(72) Inventors: Yuichi Kurata, Tokyo (JP); Takeshi Ansai, Tokyo (JP); Satoru Shoshi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/577,595

(22) PCT Filed: May 29, 2015

(86) PCT No.: PCT/JP2015/065697
§ 371 (c)(1),
(2) Date: Nov. 28, 2017

(87) PCT Pub. No.: WO2016/194093
PCT Pub. Date: Dec. 8, 2016

(65) Prior Publication Data
US 2018/0134923 A1 May 17, 2018

(51) Int. Cl.
*C09J 7/38* (2018.01)
*C09J 7/25* (2018.01)
*C09D 135/02* (2006.01)
*C09J 133/10* (2006.01)
*H01M 2/26* (2006.01)
*C08K 5/54* (2006.01)

(52) U.S. Cl.
CPC ............ *C09J 7/385* (2018.01); *C09D 135/02* (2013.01); *C09J 7/25* (2018.01); *C09J 133/10* (2013.01); *H01M 2/263* (2013.01); *C08K 5/54* (2013.01); *C09J 2433/00* (2013.01); *C09J 2433/003* (2013.01); *C09J 2467/005* (2013.01); *C09J 2479/086* (2013.01)

(58) Field of Classification Search
None
See application file for complete search history.

(56) References Cited

U.S. PATENT DOCUMENTS

| 5,604,035 A * | 2/1997 | Kojima | C08F 220/28 428/355 AC |
| 2011/0159344 A1 | 6/2011 | Kobayashi et al. | |
| 2012/0183769 A1 * | 7/2012 | Nasu | C09J 133/24 428/352 |
| 2013/0194221 A1 * | 8/2013 | Takada | B32B 7/02 345/173 |
| 2014/0004331 A1 | 1/2014 | Hida et al. | |
| 2014/0037924 A1 * | 2/2014 | Furuta | C09J 7/22 428/214 |
| 2018/0155582 A1 * | 6/2018 | Ansai | C09J 7/29 |
| 2018/0159166 A1 * | 6/2018 | Ansai | C09J 133/00 |
| 2018/0159167 A1 * | 6/2018 | Ansai | C09J 7/22 |

FOREIGN PATENT DOCUMENTS

| JP | H01-279988 A | 11/1989 | |
| JP | 2000-100396 A | 4/2000 | |
| JP | 2002-056823 A | 2/2002 | |
| JP | 2002-249752 A | 9/2002 | |
| JP | 2004-247159 A | 9/2004 | |
| JP | 2010-040227 A | 2/2010 | |
| JP | 2010-155933 A | 7/2010 | |
| JP | 2011-138632 A | 7/2011 | |
| JP | 2012-184396 A | 9/2012 | |
| JP | 2013-180552 A | 9/2013 | |
| JP | 2013-194073 A | 9/2013 | |
| JP | 2014-116138 A | 6/2014 | |
| JP | 2014-236155 A | 12/2014 | |
| JP | 5639733 B | 12/2014 | |
| JP | 2015-048428 A | 3/2015 | |
| WO | WO-2012140955 A1 * | 10/2012 | C09J 7/38 |

OTHER PUBLICATIONS

International Search Report of the International Searching Authority dated Aug. 18, 2015 for the corresponding international application No. PCT/JP2015/065697 (and English translation).

* cited by examiner

*Primary Examiner* — Anish P Desai
(74) *Attorney, Agent, or Firm* — Posz Law Group, PLC (57) ABSTRACT

A pressure sensitive adhesive sheet for use for a battery is provided. The pressure sensitive adhesive sheet comprises a base material, a hard coat layer provided at one side of the base material, and a pressure sensitive adhesive layer provided at a side of the hard coat layer opposite to the base material. The pressure sensitive adhesive sheet can well maintain the adhesive strength to suppress delamination from an adherend even in case of contact with an electrolyte solution.

13 Claims, 1 Drawing Sheet

PRESSURE SENSITIVE ADHESIVE SHEET

CROSS REFERENCE TO RELATED APPLICATIONS

This application is a U.S. national stage application of PCT/JP2015/065697 filed on May 29, 2015, the contents of which are incorporated herein by reference.

TECHNICAL FIELD

The present invention relates to a pressure sensitive adhesive sheet for use for a battery and particularly to a pressure sensitive adhesive sheet for use inside a battery.

BACKGROUND ART

In some batteries, a strip-like laminate is housed therein in a state in which the laminate is wound up. The laminate is formed by laminating a positive electrode, a separator, and a negative electrode in this order. The positive and negative electrodes are connected to respective electrode lead-out tabs of conductors, which electrically connect the positive and negative electrodes respectively to a positive electrode terminal and a negative electrode terminal of the battery.

A pressure sensitive adhesive tape may be used as a stopper for the above wound-up laminate and/or used for fixation of the electrode lead-out tabs to the electrodes. Patent Documents 1 and 2 disclose such pressure sensitive adhesive tapes. These pressure sensitive adhesive tapes each comprise a base material and a pressure sensitive adhesive layer provided on one surface of the base material.

PRIOR ART DOCUMENTS

Patent Documents

[Patent Document 1] JP5639733B
[Patent Document 2] JP2011-138632A

SUMMARY OF THE INVENTION

Problems to be Solved by the Invention

A pressure sensitive adhesive tape used inside a battery may be in contact with an electrolyte solution which fills the battery and may also be exposed to heat generated, such as during charge and discharge of the battery. Particularly in recent years, development of compact and high performance batteries has been progressed, and the pressure sensitive adhesive tape used inside the batteries will be exposed to more severe conditions.

To allow batteries to exhibit satisfactory performance, it is required for the pressure sensitive adhesive tape to maintain a high adhesion property with an adherend even when exposed to such severe conditions as described above. Unfortunately, the conventional pressure sensitive adhesive tapes may not be able to sufficiently satisfy such requirements.

The present invention has been made in consideration of such actual circumstances and an object of the present invention is to provide a pressure sensitive adhesive sheet that can well maintain the adhesive strength to suppress delamination from an adherend even in case of contact with an electrolyte solution.

Means for Solving the Problems

To achieve the above object, first, the present invention provides a pressure sensitive adhesive sheet for use for a battery, comprising: a base material; a hard coat layer provided at one side of the base material; and a pressure sensitive adhesive layer provided at a side of the hard coat layer opposite to the base material (Invention 1).

In the pressure sensitive adhesive sheet according to the above invention (Invention 1), the hard coat layer is provided between the base material and the pressure sensitive adhesive layer. The hard coat layer thereby blocks permeation of an electrolyte solution even when the pressure sensitive adhesive sheet is in contact with the electrolyte solution. This allows the pressure sensitive adhesive layer to well maintain the adhesive strength, and the pressure sensitive adhesive sheet is less likely to delaminate from an adherend. Thus, deterioration of performance due to the pressure sensitive adhesive sheet is suppressed in a battery for which the pressure sensitive adhesive sheet is used.

In the above invention (Invention 1), the hard coat layer provided at the base material may preferably have pencil hardness of HB or more as measured in accordance with JIS K5600-5-4 (Invention 2).

In the above invention (Invention 1, 2), the base material may preferably have flame retardancy that satisfies flame retardancy level V-0 of UL94 standard (Invention 3).

In the above invention (Invention 1-3), after a pressure sensitive adhesive that constitutes the pressure sensitive adhesive layer is immersed in a solvent of a nonaqueous electrolyte solution at 60° C. for 24 hours, the pressure sensitive adhesive may preferably have a gel fraction of 20-100% (Invention 4).

In the above invention (Invention 1-4), after the pressure sensitive adhesive sheet attached to an aluminum plate is immersed in a solvent of a nonaqueous electrolyte solution at 100° C. for 6 hours, adhesive strength of the pressure sensitive adhesive sheet to the aluminum plate may preferably be 0.1-15 N/25 mm (Invention 5).

In the above invention (Invention 1-5), the pressure sensitive adhesive layer may preferably have storage elastic modulus at 120° C. of 1-500 kPa (Invention 6).

Advantageous Effect of the Invention

According to the present invention, a pressure sensitive adhesive sheet is provided which can well maintain the adhesive strength to suppress delamination from an adherend even in case of contact with an electrolyte solution.

EMBODIMENTS FOR CARRYING OUT THE INVENTION

Hereinafter, embodiments of the present invention will be described.

<Pressure Sensitive Adhesive Sheet>

Figure 1:
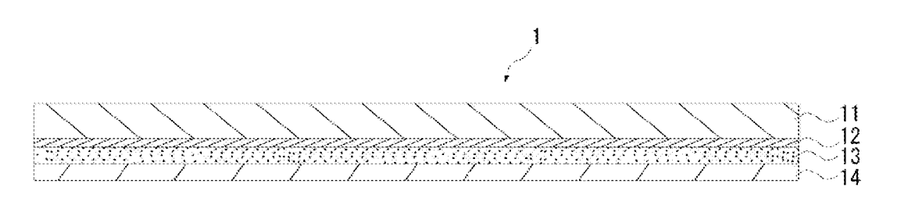
FIG. 1 is a cross-sectional view of a pressure sensitive adhesive sheet according to an embodiment of the present invention.

As illustrated in FIG. 1, a pressure sensitive adhesive sheet 1 according to the present embodiment may be composed of a base material 11, a hard coat layer 12 provided at one side of the base material 11, a pressure sensitive adhesive layer 13 provided at a side of the hard coat layer 12 opposite to the base material 11, and a release sheet 14 provided at a side of the pressure sensitive adhesive layer 13 opposite to the hard coat layer 12.

According to the pressure sensitive adhesive sheet 1 of the present embodiment, the electrolyte solution which has infiltrated in the base material 11 is suppressed from permeating the hard coat layer 12 to reach the pressure sensitive adhesive layer 13 because the hard coat layer 12 blocks the electrolyte solution. This reduces the amount of electrolyte solution infiltrating into the pressure sensitive adhesive layer 13.

Also in a configuration in which the hard coat layer 12 is laminated on the surface of the base material 11 opposite to the pressure sensitive adhesive layer 13 rather than between the base material 11 and the pressure sensitive adhesive layer 13, it may be expected that the infiltration of the electrolyte solution can be reduced to some extent. In such a configuration, however, the electrolyte solution which has infiltrated in the base material 11 from its end parts may reach the pressure sensitive adhesive layer 13, which is in contact with the base material 11, through the inside of the base material 11. Some existing materials used for the base material 11 in general have significantly high permeability to an electrolyte solution, and if such a material is used, a certain amount of electrolyte solution may infiltrate into the base material 11 even only from its end parts and then penetrate into the pressure sensitive adhesive layer 13.

In contrast, the pressure sensitive adhesive sheet 1 according to the present embodiment is provided with the hard coat layer 12 between the base material 11 and the pressure sensitive adhesive layer 13. The hard coat layer 12 thereby blocks not only the electrolyte solution having infiltrated in the base material 11 from its main surface but also the electrolyte solution having infiltrated in the base material 11 from its end parts, and the electrolyte solution is thus suppressed from reaching the pressure sensitive adhesive layer 13.

As described above, in the pressure sensitive adhesive sheet 1 according to the present embodiment, the amount of electrolyte solution infiltrating into the pressure sensitive adhesive layer 13 is reduced. This can well maintain the adhesive strength of the pressure sensitive adhesive layer 13 and suppress the delamination of the pressure sensitive adhesive sheet 1 from an adherend. Deterioration of performance due to the pressure sensitive adhesive sheet is thereby suppressed in a battery for which the pressure sensitive adhesive sheet 1 is used. Moreover, the amount of electrolyte solution infiltrating into the pressure sensitive adhesive layer 13 is reduced to reduce the amount of components of the pressure sensitive adhesive layer 13 which dissolve into the electrolyte solution. This suppresses the erroneous operation, thermal runaway, and short circuit of a battery for which the pressure sensitive adhesive sheet 1 is used.

1. Base Material

In the pressure sensitive adhesive sheet 1 according to the present embodiment, the base material 11 may preferably have flame retardancy that satisfies the flame retardancy level V-0 of the UL94 standard. Owing to such flame retardancy of the base material 11, denaturation and deformation of the base material 11 are suppressed even when the battery generates heat due to its ordinary use. Moreover, even if troubles occur in the battery and it generates excessive heat, ignition and/or burning of the base material 11 are suppressed to prevent a serious accident.

The material of the base material 11 can be appropriately selected from the viewpoints of flame retardancy, heat resistance, insulation properties, reactivity with an electrolyte solution, permeability to an electrolyte solution, and the like. In particular, it may be preferred to use a resin film as the base material 11. Examples of the resin film include films of polyesters such as polyethylene terephthalate, polybutylene terephthalate and polyethylene naphthalate, polyolefin films such as a polyethylene film and polypropylene film, cellophane, a diacetyl cellulose film, triacetyl cellulose film, acetyl cellulose butyrate film, polyvinyl chloride film, polyvinylidene chloride film, polyvinyl alcohol film, ethylene-vinyl acetate copolymer film, polystyrene film, polycarbonate film, polymethylpentene film, polysulfone film, polyether ether ketone film, polyether sulfone film, polyether imide film, fluorine resin film, polyamide film, polyimide film, polyamideimide film, acrylic resin film, polyurethane resin film, norbornene-based polymer film, cyclic olefin-based polymer film, cyclic conjugated diene-based polymer film, vinyl alicyclic hydrocarbon polymer film, other resin films, and laminated films thereof. In particular, it may be preferred to use a polyimide film, polyetherimide film, or polyether ether ketone film which exhibits excellent flame retardancy and heat resistance. Among these, the polyimide film may be preferably used because it exhibits higher heat resistance. As used in the present description, the term "polymer" encompasses the concept of a "copolymer."

The thickness of the base material 11 may be preferably 5-200 μm, particularly preferably 10-100 μm, and further preferably 15-40 μm. When the thickness of the base material 11 is 5 μm or more, the base material 11 has moderate rigidity and the occurrence of curl is effectively suppressed even if curing shrinkage occurs during the formation of the hard coat layer 12 on the base material 11. On the other hand, the thickness of the base material 11 being 200 μm or less allows the pressure sensitive adhesive sheet 1 to have moderate flexibility and, even when the pressure sensitive adhesive sheet 1 is attached to a surface having a height difference, such as when an electrode and an electrode lead-out tab are fixed to each other, the pressure sensitive adhesive sheet 1 can well follow the height difference.

2. Hard Coat Layer (1) Physical Properties of Hard Coat Layer

In the pressure sensitive adhesive sheet 1 according to the present embodiment, the pencil hardness of the hard coat layer 12 in a state of being provided on the base material 11 may be preferably HB or more and particularly preferably H or more as measured in accordance with JIS K5600-5-4. When the hard coat layer 12 has such pencil hardness, permeation of an electrolyte solution through the hard coat layer 12 is effectively blocked. Thus, even when the pressure sensitive adhesive sheet 1 is in contact with the electrolyte solution, the pressure sensitive adhesive layer 13 can well maintain the adhesive strength to suppress delamination of the pressure sensitive adhesive sheet 1 from an adherend. The upper limit of the pencil hardness of the hard coat layer is not particularly restricted, but may be preferably 9H or less, particularly preferably 6H or less, and further preferably 3H or less from the viewpoint of obtaining excellent following ability to a height difference.

(2) Composition of Hard Coat Layer

The hard coat layer may preferably be formed of a composition that contains an organic component and an inorganic filler (this composition may be referred to as a "composition for hard coat layer," hereinafter). In particular, the hard coat layer may preferably be made of a material obtained by curing a composition that contains an active energy ray-curable component and an inorganic filler.

(2-1) Active Energy Ray-Curable Component

The active energy ray-curable component is not particularly limited, provided that it can be cured by irradiation with active energy rays to exhibit desired hardness.

Specific examples of the active energy ray-curable component include a polyfunctional (meth)acrylate-based monomer, (meth)acrylate-based prepolymer, and active energy ray-curable polymer, among which the polyfunctional (meth)acrylate-based monomer and/or (meth)acrylate-based prepolymer may be preferred. The polyfunctional (meth)acrylate-based monomer and the (meth)acrylate-based prepolymer may each be used alone and both may also be used in combination. As used in the present description, the (meth)acrylate refers to both an acrylate and a methacrylate. The same applies to other similar terms.

Examples of the polyfunctional (meth)acrylate-based monomer include 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylol propane tri(meth) acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, caprolactone-modified dipentaerythritol hexa(meth)acrylate, and other appropriate polyfunctional (meth)acrylates. These may each be used alone and two or more types may also be used in combination.

On the other hand, examples of the (meth)acrylate-based prepolymer include polyester acrylate-based, epoxy acrylate-based, urethane acrylate-based, and polyol acrylate-based prepolymers. One type of prepolymer may be used alone and two or more types may also be used in combination.

A (meth)acrylic ester polymer having an active energy ray-curable group at a side chain (referred to as an "active energy ray-curable (meth)acrylic ester polymer (A)," hereinafter) can be used as the active energy ray-curable polymer. The active energy ray-curable (meth)acrylic ester polymer (A) may preferably be obtained by reacting an acrylic-based polymer (a1) having a functional group-containing monomer unit and an unsaturated group-containing compound (a2) having a substituent group that is bonded to the functional group. Preferred examples of the unsaturated group include (meth)acryloyl group.

The glass-transition point after curing of the active energy ray-curable component which constitutes the hard coat layer 12 of the present embodiment may be preferably 130° C. or higher and more preferably 150° C. or higher, and an active energy ray-curable component of which the glass-transition point is not observed may be particularly preferred. When the glass-transition point of the active energy ray-curable component satisfies the above, the hard coat layer 12 has excellent heat resistance, and a battery that includes the pressure sensitive adhesive sheet 1 provided with such a hard coat layer 12 can have excellent performance and safety.

When two or more types of the active energy ray-curable components are used in the hard coat layer 12 of the present embodiment, it may be preferred for them to have excellent compatibility with each other.

(2-2) Other Organic Components

Examples of organic components that can be used other than the active energy ray-curable component include a thermoset resin and a thermoplastic resin. By compounding such components, interfacial adhesion between the hard coat layer 12 and the base material 11 can be made higher. Specific examples of such organic components include a polyamide imide resin, polyether imide resin, polyimide resin, polyarylate resin, polyether ether ketone resin, polysulfone resin, melamine resin, and phenol resin. Among these, the polyamide imide resin may be preferred because of its excellent heat resistance.

(2-3) Inorganic Filler

The composition for hard coat layer which constitutes the hard coat layer 12 of the present embodiment may preferably contain an inorganic filler. When containing an inorganic filler, the hard coat layer 12 of the present embodiment can be provided with high surface hardness.

Preferred examples of the inorganic filler include powders of silica, alumina, boehmite, talc, calcium carbonate, titanium oxide, iron oxide, silicon carbide, boron nitride, zirconium oxide and other appropriate materials, spherical beads thereof, single crystal fibers, and glass fibers. These can each be used alone and two or more types can also be used in combination. Among these, silica, alumina, boehmite, titanium oxide, zirconium oxide and the like may be preferred. From the viewpoint of hardness, silica and alumina may be preferred and silica may be particularly preferred.

It may also be preferred for the inorganic filler to be surface-modified. A reactive silica can be exemplified as such a particularly-preferred inorganic filler.

As used in the present description, the "reactive silica" refers to silica fine particles that are surface-modified with an organic compound having an active energy ray-curable unsaturated group. The above silica fine particles (reactive silica) which are surface-modified with an organic compound having an active energy ray-curable unsaturated group may ordinarily be obtained, for example, by a reaction between silanol groups on the surfaces of silica fine particles and an active energy ray-curable unsaturated group-containing organic compound having functional groups (such as isocyanate groups, epoxy groups, and carboxy groups) that can react with the silanol groups. The average diameter of the silica fine particles may be about 0.5-500 nm and preferably 1-200 nm. Preferred examples of the above active energy ray-curable unsaturated group include a (meth)acryloyl group and a vinyl group.

Examples to be preferably used as the active energy ray-curable unsaturated group-containing organic compound having functional groups that can react with the silanol groups include compounds or the like represented by General Formula (I).

[Chemical Formula 1]

(In the formula, $R^1$ represents a hydrogen atom or a methyl group and $R^2$ represents a halogen atom,

[Chemical Formula 2]

-continued

Available examples of such compounds include (meth) acrylic acid and derivatives of (meth)acrylic acid, such as (meth)acrylic chloride, (meth)acryloyloxyethyl isocyanate, glycidyl (meth)acrylate, 2,3-iminopropyl (meth)acrylate, 2-hydroxyethyl (meth)acrylate, and acryloyloxypropyltrimethoxysilane. These (meth)acrylic acid derivatives may each be used alone and two or more types may also be used in combination.

Commercially-available examples of an organic-inorganic hybrid material (organosilica sol) that contains such an reactive silica and the previously-described polyfunctional (meth)acrylate-based monomer and/or (meth)acrylate-based prepolymer include products of the trade name "OPSTAR Z7530," "OPSTAR Z7524," "OPSTAR TU4086," and "OPSTAR Z7537" (all available from JSR Corporation).

Other examples of preferred inorganic fillers include alumina ceramic nanoparticles, a silica sol in which silica fine particles having silanol groups exposed at the silica surface are suspended in a colloidal state in the dispersion medium, and an organosilica sol in which silanol groups on the silica surface are surface-treated with a silane coupling agent or the like.

The average particle diameter of the inorganic filler used in the present embodiment may be preferably 1-1,000 nm, particularly preferably 10-500 nm, and further preferably 20-200 nm. When the average particle diameter of the inorganic filler is 1 nm or more, the hard coat layer 12 obtained by curing the composition for hard coat layer has higher surface hardness. When the average particle diameter of the inorganic filler is 1,000 nm or less, the dispersibility of the inorganic filler in the composition for hard coat layer is excellent and it is thus possible to effectively prevent the occurrence of irregularities on the surface of the hard coat layer 12 opposite to the base material 11 during the formation of the hard coat layer 12 on the base material 11. Moreover, when the pressure sensitive adhesive layer 13 is formed on that surface, significantly high smoothness can be obtained on the surface of the pressure sensitive adhesive layer 13 opposite to the hard coat layer 12. This allows the pressure sensitive adhesive layer 13 to exhibit an excellent adhesion property to an adherend. The average particle diameter of the inorganic filler is to be measured using a zeta potential measurement method.

The content of the inorganic filler in the hard coat layer 12 of the present embodiment may be preferably 0-90 wt % (90 wt % or less), more preferably 30-85 wt %, particularly preferably 40-80 wt %, and further preferably 45-70 wt % with respect to the hard coat layer 12. When the inorganic filler is contained, the content being 30 wt % or more allows the hard coat layer 12 to have higher surface hardness. The content of the inorganic filler being 90 wt % or less enables easy film formation using the composition for hard coat layer.

(2-4) Other Components

The composition for forming the hard coat layer 12 of the present embodiment may contain various additives in addition to the above-described components. Examples of such additives include a photopolymerization initiator, antioxidant, antistatic, silane coupling agent, antiaging agent, thermal polymerization inhibitor, colorant, surfactant, storage stabilizer, plasticizer, glidant, antifoam, and organic-based filler.

When the hard coat layer 12 is formed using an active energy ray-curable component, it is preferred to use a photopolymerization initiator. The photopolymerization initiator is not particularly limited, provided that it functions as a photopolymerization initiator for the active energy ray-curable component to be used. Examples of the photopolymerization initiator include acylphosphine oxide-based compounds, benzoin compounds, acetophenone compounds, titanocene compounds, thioxanthone compounds, and peroxide compounds. Specific examples include 1-hydroxycyclohexyl phenyl ketone, 2-hydroxy-2-methyl-1-phenyl-propane-1-one, 2,2-dimethoxy-1,2-diphenylethan-1-one, benzoin, benzoin methyl ether, benzoin ethyl ether, benzoin isopropyl ether, benzyl diphenyl sulfide, tetramethyl thiuram monosulfide, azobisisobutyronitrile, dibenzyl, diacetyl, and β-chloroanthraquinone.

The content of the above photopolymerization initiator in the composition for hard coat layer may be preferably 0.1-20 mass parts in general and particularly preferably 1-15 mass parts to 100 mass parts of the active energy ray-curable component.

(3) Thickness of Hard Coat Layer

The thickness of the hard coat layer 12 may be preferably 0.1-10 μm, particularly preferably 0.5-7 μm, and further preferably 1-4 μm. When the thickness of the hard coat layer 12 is 0.1 μm or more, permeation of the electrolyte solution through the hard coat layer 12 is effectively blocked. On the other hand, the thickness of the hard coat layer 12 being 10 μm or less allows the pressure sensitive adhesive sheet 1 to have moderate flexibility and, even when the pressure sensitive adhesive sheet 1 is attached to a surface having a height difference, such as when an electrode and an electrode lead-out tab are fixed to each other, the pressure sensitive adhesive sheet 1 can well follow the height difference.

3. Pressure Sensitive Adhesive Layer (1) Physical Properties of Pressure Sensitive Adhesive/Pressure Sensitive Adhesive Layer In the pressure sensitive adhesive sheet 1 according to the present embodiment, after the pressure sensitive adhesive which constitutes the pressure sensitive adhesive layer 13 is immersed in a solvent of a nonaqueous electrolyte solution at 60° C. for 24 hours, the gel fraction of the pressure sensitive adhesive may preferably be 20-100%. In particular, when the pressure sensitive adhesive which constitutes the pressure sensitive adhesive layer 13 is an acrylic-based pressure sensitive adhesive which will be described later, the above gel fraction may be preferably 20-98%, particularly preferably 50-95%, and further preferably 70-85%. The gel fraction being 20% or more allows the amount of dissolution of components from the pressure sensitive adhesive layer 13 to be suppressed low even when the pressure sensitive adhesive layer 13 is in contact with an electrolyte solution. This can effectively suppress the erroneous operation, thermal runaway, and short circuit of a battery for which the pressure sensitive adhesive sheet 1 is used. On the other hand, the gel fraction being 98% or less allows the pressure sensitive adhesive sheet 1 to have moderate flexibility and, even when the pressure sensitive adhesive sheet 1 is attached to a surface having a height difference, such as when an electrode and an electrode lead-out tab are fixed to each other, the pressure sensitive adhesive sheet 1 can well follow the height difference. The solvent of a nonaqueous electrolyte solution as used herein may be a prepared liquid obtained by mixing ethylene carbonate and diethyl carbonate at a mass ratio of 1:1. A method of testing the gel fraction is as described in the exemplary test, which will be described later.

In the pressure sensitive adhesive sheet 1 according to the present embodiment, the storage elastic modulus at 120° C. of the pressure sensitive adhesive layer 13 may be preferably 1-500 kPa, particularly preferably 10-200 kPa, and further preferably 40-100 kPa. When the storage elastic modulus is within the above range, the pressure sensitive adhesive layer 13 has sufficient hardness even under a condition of relatively high temperatures. The swelling of the pressure sensitive adhesive layer 13 is therefore effectively prevented even under an estimated temperature of the electrolyte solution when used in an actual battery and it is possible to maintain certain adhesive strength. Moreover, even when pressure is applied to the pressure sensitive adhesive sheet 1, such as when the pressure sensitive adhesive sheet 1 is used for fixation of an electrode and an electrode lead-out tab so that winding pressure is applied to the pressure sensitive adhesive sheet 1, the pressure sensitive adhesive layer 13 is less likely to deform and protrude from the base material 11 and the hard coat layer 12. This prevents increase in the contact area with the electrolyte solution, and the amount of dissolution of components from the pressure sensitive adhesive layer 13 is suppressed low. This can effectively suppress the erroneous operation, thermal runaway, and short circuit of a battery for which the pressure sensitive adhesive sheet 1 is used. A method of testing the storage elastic modulus is as described in the exemplary test, which will be described later.

(2) Composition of Pressure Sensitive Adhesive Layer

The pressure sensitive adhesive which constitutes the pressure sensitive adhesive layer 13 is not particularly limited and can be appropriately selected from the viewpoints of solubility in an electrolyte solution, flame retardancy, heat resistance, insulating properties, and the like. In particular, an acrylic-based pressure sensitive adhesive, silicone-based pressure sensitive adhesive, rubber-based pressure sensitive adhesive, and urethane-based pressure sensitive adhesive may be preferred as the pressure sensitive adhesive which constitutes the pressure sensitive adhesive layer 13. Among these, the acrylic-based pressure sensitive adhesive may be particularly preferred from the viewpoints of an adhesion property to the hard coat layer 12, an electrode and the like, easy delicate adjustment of the storage elastic modulus at 120° C. and adhesive strength of the pressure sensitive adhesive layer 13, etc.

(2-1) Acrylic-Based Pressure Sensitive Adhesive

The acrylic-based pressure sensitive adhesive may preferably contain a (meth)acrylic ester polymer and particularly preferably contain a compound in which the (meth)acrylic ester polymer is crosslinked by a crosslinker.

The (meth)acrylic ester polymer may preferably contain a (meth)acrylic alkyl ester of which the carbon number of alkyl group is 1-20, as a monomer that constitutes the polymer. This allows the obtained pressure sensitive adhesive to exhibit a preferred pressure sensitive adhesive property. The (meth)acrylic ester polymer may be particularly preferably a copolymer of a (meth)acrylic alkyl ester of which the carbon number of alkyl group is 1-20, a monomer having a functional group that reacts with the crosslinker (reactive functional group-containing monomer), and other monomers that may be used as desired.

Examples of the (meth)acrylic alkyl ester of which the carbon number of alkyl group is 1-20 include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth)acrylate, isooctyl (meth)acrylate, n-decyl (meth)acrylate, n-dodecyl (meth)acrylate, myristyl (meth)acrylate, palmityl (meth)acrylate, and stearyl (meth)acrylate. Among these, (meth)acrylic alkyl ester of which the carbon number of alkyl group is 1-8 may be preferred from the viewpoint of further improving the pressure sensitive adhesive property, and the methyl (meth)acrylate, n-butyl (meth)acrylate, and 2-ethylhexyl (meth)acrylate may be particularly preferred. These may each be used alone and two or more types may also be used in combination.

The (meth)acrylic ester polymer may preferably contain 40-99 mass %, particularly preferably contain 50-90 mass %, and further preferably contain 75-85 mass % of the (meth)acrylic alkyl ester of which the carbon number of alkyl group is 1-20, as the monomer unit which constitutes the polymer.

Preferred examples of the above reactive functional group-containing monomer include a monomer having a hydroxy group in the molecule (hydroxy group-containing monomer), a monomer having a carboxy group in the molecule (carboxyl group-containing monomer), and a monomer having an amino group in the molecule (amino group-containing monomer). These may each be used alone and two or more types may also be used in combination.

Examples of the hydroxy group-containing monomer include hydroxyalkyl (meth)acrylate, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. Among these, the 2-hydroxyethyl (meth)acrylate and 4-hydroxybutyl (meth)acrylate may be preferred from the viewpoints of reactivity of the hydroxy group with the crosslinker in the (meth)acrylic ester polymer to be obtained and copolymerizability with other monomers. These may each be used alone and two or more types may also be used in combination.

Examples of the carboxy group-containing monomer include ethylenically-unsaturated carboxylic acid, such as acrylic acid, methacrylic acid, crotonic acid, maleic acid, itaconic acid, and citraconic acid. Among these, the acrylic acid may be preferred from the viewpoints of reactivity of the carboxy group with the crosslinker in the (meth)acrylic ester polymer to be obtained and copolymerizability with other monomers. These may each be used alone and two or more types may also be used in combination.

Examples of the amino group-containing monomer include aminoethyl (meth)acrylate and n-butylaminoethyl (meth)acrylate. These may each be used alone and two or more types may also be used in combination.

The (meth)acrylic ester polymer may preferably contain 0.1-40 mass %, particularly preferably contain 0.5-20 mass %, and further preferably contain 1.0-4.0 mass % of the reactive functional group-containing monomer. When the content of the reactive functional group-containing monomer is 0.1 mass % or more, it is possible to effectively improve the cohesive strength of the pressure sensitive adhesive obtained by constituting a crosslinked structure via a crosslinker which will be described later. When the content is 40 mass % or less, the affinity between the pressure sensitive adhesive layer 13 and the electrolyte solution is prevented from being excessively high and it is possible to prevent the swelling of the pressure sensitive adhesive in the pressure sensitive adhesive layer 13 due to the electrolyte solution.

Examples of the above other monomers include alkoxyalkyl (meth)acrylate, such as methoxyethyl (meth)acrylate and ethoxyethyl (meth)acrylate, (meth)acrylate having an aliphatic ring, such as cyclohexyl (meth)acrylate, non-crosslinkable acrylamide, such as acrylamide and methacrylamide, (meth)acrylate having a non-crosslinkable tertiary amino group, such as N,N-dimethylaminoethyl (meth)acrylate and N,N-dimethylaminopropyl (meth)acrylate, vinyl acetate, and styrene. These may each be used alone and two or more types may also be used in combination.

The polymerization form of the (meth)acrylic ester polymer may be a random copolymer and may also be a block copolymer.

The weight-average molecular weight of the (meth)acrylic ester polymer may be preferably 300,000-2,500,000, particularly preferably 400,000-1,900,000, and further preferably 700,000-1,600,000. When the weight-average molecular weight of the (meth)acrylic ester polymer is 300,000 or more, the durability of the pressure sensitive adhesive layer 13 is excellent. When the weight-average molecular weight of the (meth)acrylic ester polymer is 2,500,000 or less, good coating properties are obtained. As used in the present description, the weight-average molecular weight refers to a standard polystyrene equivalent value that is measured using a gel permeation chromatography (GPC) method.

In the above acrylic-based pressure sensitive adhesive, one type of the (meth)acrylic ester polymer may be used alone and two or more types may also be used in combination.

It suffices that the crosslinker is reactive with a reactive functional group of the (meth)acrylic ester polymer. Examples of the crosslinker include an isocyanate-based crosslinker, epoxy-based crosslinker, amine-based crosslinker, melamine-based crosslinker, aziridine-based crosslinker, hydrazine-based crosslinker, aldehyde-based crosslinker, oxazoline-based crosslinker, metal alkoxide-based crosslinker, metal chelate-based crosslinker, metal salt-based crosslinker, and ammonium salt-based crosslinker. One type of the crosslinker may be used alone and two or more types may also be used in combination.

The isocyanate-based crosslinker contains at least a polyisocyanate compound. Examples of the polyisocyanate compound include aromatic polyisocyanates such as tolylene diisocyanate, diphenylmethane diisocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret bodies and isocyanurate bodies thereof, and adduct bodies that are reaction products with low molecular active hydrogen-containing compounds such as ethylene glycol, propylene glycol, neopentyl glycol, trimethylol propane, and castor oil. Among these, trimethylolpropane-modified aromatic polyisocyanate may be preferred and trimethylolpropane-modified tolylene diisocyanate and trimethylolpropane-modified xylylene diisocyanate may be particularly preferred from the viewpoint of reactivity with hydroxy groups.

The amount of the crosslinker to be used may be preferably 0.001-10 mass parts, particularly preferably 0.01-5 mass parts, and further preferably 1-3 mass parts to 100 mass parts of the (meth)acrylic ester polymer.

When the pressure sensitive adhesive composition which contains a crosslinker and a (meth)acrylic ester polymer that contains a reactive functional group-containing monomer as a monomer unit constituting the polymer is subjected to heating or the like, the crosslinker reacts with the reactive functional group of the reactive functional group-containing monomer which constitutes the (meth)acrylic ester polymer. This allows a structure to be formed in which the (meth) acrylic ester polymer is crosslinked by the crosslinker. The gel fraction of the obtained pressure sensitive adhesive can thus be set to a desired value, and the cohesive strength of the pressure sensitive adhesive and therefore the strength and durability are improved.

If desired, the above acrylic-based pressure sensitive adhesive may contain various commonly-used additives, such as a refractive index adjuster, antistatic, tackifier, silane coupling agent, antioxidant, ultraviolet absorber, light stabilizer, softening agent, filler, light curing agent, and photopolymerization initiator.

(2-2) Silicone-Based Pressure Sensitive Adhesive

The silicone-based pressure sensitive adhesive may preferably contain an organopolysiloxane, in particular, an addition-type organopolysiloxane (a cured product thereof). The addition-type organopolysiloxane may preferably be obtained through a reaction between an organopolysiloxane of which the main skeleton is a siloxane bond and which has an alkenyl group and an organohydrogenpolysiloxane.

The organopolysiloxane of which the main skeleton is a siloxane bond and which has an alkenyl group may preferably be a compound that is represented by the following average unit formula (II) and has at least two alkenyl groups in the molecule.

$$R^1{}_a SiO_{(4-a)/2} \qquad (II)$$

(In the formula, each $R^1$ is independently the same or different unsubstituted or substituted monovalent hydrocarbon group of which the carbon number is 1-12 and preferably 1-8, and "a" is a positive number of 1.5-2.8, preferably 1.8-2.5, and more preferably 1.95-2.05.)

Examples of the above unsubstituted or substituted monovalent hydrocarbon group represented by $R^1$ bonded to the silicon atom include alkenyl groups such as a vinyl group, allyl group, propenyl group, isopropenyl group, butenyl group, hexenyl group, cyclohexenyl group and octenyl group, alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group and decyl group, aryl groups such as a phenyl group, tolyl group, xylyl group and naphthyl group, aralkyl groups such as a benzyl group, phenylethyl group and phenylpropyl group, and those obtained by substituting a part or all of the hydrogen atoms of these groups with halogen atoms such as fluorine, bromine and chlorine, cyano groups, or other appropriate groups, for example, a chloromethyl group, chloropropyl group, bromoethyl group, trifluoropropyl group, cyanoethyl group, and the like. The alkenyl group may preferably be a vinyl group from the viewpoint of reducing the curing time and high productivity.

The organohydrogenpolysiloxane has a SiH group in the molecule. The above alkenyl group of the organopolysiloxane and the SiH group of the organohydrogenpolysiloxane react with each other through an addition reaction and an addition-type organopolysiloxane can thereby be obtained.

The addition-type organopolysiloxane is well cured in the presence of a platinum catalyst and, therefore, the above silicone-based pressure sensitive adhesive may preferably contain a platinum catalyst. Examples of the platinum catalyst include platinum black, platinum chloride, chloroplatinic acid, a reaction product of chloroplatinic acid and monohydric alcohol, a complex of chloroplatinic acid and olefins, and platinum bisacetoacetate.

The content of the platinum catalyst in the above silicone-based pressure sensitive adhesive may be preferably 0.01-3 mass parts and particularly preferably 0.05-2 mass parts to 100 mass parts of the addition-type organopolysiloxane. The content of the platinum catalyst being within the above range allows the addition-type organopolysiloxane to be cured without interfering with the coating, and the pressure sensitive adhesive layer 13 can thus be formed.

The addition-type organopolysiloxane can contain an organopolysiloxane (silicone resin) that contains a trifunctional or tetrafunctional siloxane unit in the molecule in order to increase the adhesive strength.

The content of the organopolysiloxane, which contains a trifunctional or tetrafunctional siloxane unit, in the above silicone-based pressure sensitive adhesive may be preferably 0-100 mass parts, particularly preferably 5-70 mass parts, and further preferably 10-50 mass parts to 100 mass parts of the addition-type organopolysiloxane.

(2-3) Rubber-Based Pressure Sensitive Adhesive

The rubber-based pressure sensitive adhesive may preferably contain an A-B-A-type block copolymer as a rubber elastic component and a tackifier and, if desired, further contain an antioxidant for preventing deterioration.

Examples of the A-B-A-type block copolymer include a styrene-isoprene-styrene copolymer, styrene-butylene-styrene copolymer, styrene-ethylene-butylene-styrene copolymer, styrene-olefin-styrene copolymer, polyisoprene, polybutene, and polyisobutylene.

The content of the rubber elastic component in the rubber-based pressure sensitive adhesive may be preferably 5-50 mass % and particularly preferably 7-45 mass %. If the content of the rubber elastic component is less than 5 mass %, the cohesive strength of the rubber-based pressure sensitive adhesive decreases, while if the content of the rubber elastic component exceeds 45 mass %, the adhesive strength of the pressure sensitive adhesive layer may be unduly low.

Examples of the tackifier include a rosin-based resin, polyterpene-based resin, coumarone/indene resin, petroleum-based resin, terpene phenol resin, alkylphenol resin, styrene-based resin, phenol-based resin, and xylene resin.

The content of the tackifier in the rubber-based pressure sensitive adhesive may be preferably 10-70 mass % and particularly preferably 15-60 mass %. If the content of the tackifier is less than 10 mass %, the adhesive strength of the pressure sensitive adhesive layer decreases, while if the content of the tackifier exceeds 70 mass %, the cohesive strength of the rubber-based pressure sensitive adhesive may be unduly low.

Examples of the antioxidant include butylhydroxytoluene, 2,6-di-t-butyl-4-methylphenol, 2,5-di-t-butylhydroquinone, mercaptobenzimidazole, 1,1-bis(4-hydroxyphenol)cyclohexane, and phenyl-$\beta$-naphthylamine.

When an antioxidant is used, the content of the antioxidant in the rubber-based pressure sensitive adhesive may be preferably 0.1-10 mass % and particularly preferably 0.2-5 mass %.

(3) Thickness of Pressure Sensitive Adhesive Layer

The thickness of the pressure sensitive adhesive layer 13 may be preferably 1-50 μm, particularly preferably 3-15 μm, and further preferably 4-9 μm. When the thickness of the pressure sensitive adhesive layer 13 is 1 μm or more, the pressure sensitive adhesive sheet 1 can exhibit sufficient adhesive strength. When the thickness of the pressure sensitive adhesive layer 13 is 50 μm or less, the amount of electrolyte solution infiltrating into the pressure sensitive adhesive layer 13 from its end parts can be effectively reduced.

4. Release Sheet

The release sheet 14 is to protect the pressure sensitive adhesive layer until the use of the pressure sensitive adhesive sheet 1 and is removed when using the pressure sensitive adhesive sheet 1. In the pressure sensitive adhesive sheet 1 according to the present embodiment, the release sheet 14 may not necessarily be required.

Examples of the release sheet 14 to be used include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene-vinyl acetate film, ionomer resin film, ethylene-(meth)acrylic acid copolymer film, ethylene-(meth)acrylic ester copolymer film, polystyrene film, polycarbonate film, polyimide film, fluorine resin film, and liquid crystal polymer film. Crosslinked films thereof may also be used. A laminate film obtained by laminating a plurality of such films may also be used.

It may be preferred to perform release treatment for the release surface (surface to be in contact with the pressure sensitive adhesive layer 13) of the release sheet 14. Examples of a release agent to be used for the release treatment include alkyd-based, silicone-based, fluorine-based, unsaturated polyester-based, polyolefin-based, and wax-based release agents.

The thickness of the release sheet 14 is not particularly restricted, but may ordinarily be about 20-150 μm.

5. Physical Properties etc. of Pressure Sensitive Adhesive Sheet

In the pressure sensitive adhesive sheet 1 according to the present embodiment, after the pressure sensitive adhesive sheet 1 attached to an aluminum plate is immersed in a solvent of a nonaqueous electrolyte solution at 100° C. for 6 hours, the adhesive strength of the pressure sensitive adhesive sheet 1 to the aluminum plate may be preferably 0.1-10 N/25 mm, particularly preferably 0.5-5 N/25 mm, and further preferably 1-3 N/25 mm. The pressure sensitive adhesive sheet 1 according to the present embodiment includes the hard coat layer 12 between the base material 11 and the pressure sensitive adhesive layer 13 and can thereby achieve the adhesive strength within the above range. The solvent of a nonaqueous electrolyte solution as used herein is a prepared liquid obtained by mixing ethylene carbonate and diethyl carbonate at a mass ratio of 1:1. As used herein, the adhesive strength refers basically to a peel strength that is measured using a method of 180° peeling in accordance with JIS Z0237: 2009. Details of the method of measurement are as described in the exemplary test, which will be described later.

The thickness of the pressure sensitive adhesive sheet 1 (excluding the thickness of the release sheet 14) may be preferably 10-250 μm, particularly preferably 15-110 μm, and further preferably 20-45 μm. When the thickness of the pressure sensitive adhesive sheet 1 is within the range of 10-250 μm, the pressure sensitive adhesive sheet 1 can be more suitable in which both the adhesive strength and the heat resistance are excellent.

<Method of Manufacturing Pressure Sensitive Adhesive Sheet>

The pressure sensitive adhesive sheet 1 according to the present embodiment can be manufactured, for example, through producing a laminate of the base material 11 and the hard coat layer 12 and a laminate of the pressure sensitive adhesive layer 13 and the release sheet 14 and attaching these laminates to each other so that the hard coat layer 12 comes into contact with the pressure sensitive adhesive layer 13. From the viewpoint of enhancing the interfacial adhesion between the hard coat layer 12 and the pressure sensitive adhesive layer 13, it may be preferred to perform surface treatment such as corona treatment and plasma treatment for a surface to be attached of any one of these layers or surfaces to be attached of both of these layers and then attach these layers to each other.

The laminate of the base material 11 and the hard coat layer 12 can be produced, for example, in the following manner. First, one main surface of the base material 11 may be coated with a coating agent that contains the composition for hard coat layer and may further contain a solvent if desired, and the coating agent may be dried. The method of coating with the coating agent may be performed using an ordinary method, such as a bar coating method, knife coating method, Meyer bar method, roll coating method, blade coating method, die coating method, and gravure coating method. Drying can be performed, for example, by heating at 80-150° C. for about 30 seconds to 5 minutes.

Thereafter, the layer obtained by drying the above coating agent may be irradiated with active energy rays to cure the layer to form the hard coat layer 12. As the active energy rays, for example, electromagnetic wave or charged particle radiation having an energy quantum can be used and, specifically, ultraviolet rays, electron rays or the like can be used. In particular, ultraviolet rays may be preferred because of easy management. Irradiation with ultraviolet rays can be performed using a high pressure mercury lamp, xenon lamp or the like, and the irradiance level of ultraviolet rays may be preferably about 50-1,000 mW/cm$^2$ as the illuminance. The light amount may be preferably 50-10,000 mJ/cm$^2$, more preferably 80-5,000 mJ/cm$^2$, and particularly preferably 200-2,000 mJ/cm$^2$. On the other hand, irradiation with electron rays can be performed using an electron ray accelerator or the like, and the irradiance level of electron rays may be preferably about 10-1,000 krad.

The laminate of the pressure sensitive adhesive layer 13 and the release sheet 14 can be produced, for example, in the following manner.

When the pressure sensitive adhesive layer 13 is formed using an acrylic-based pressure sensitive adhesive, the release surface of the release sheet 14 may be coated with a coating solution that contains the above-described acrylic-based pressure sensitive adhesive and may further contain a solvent if desired, and heating treatment may be performed to form a coating film. The formed coating film itself may be the pressure sensitive adhesive layer 13 if an aging period is not necessary. If the aging period is necessary, the formed coating film may become the pressure sensitive adhesive layer 13 after the aging period passes.

Drying treatment when volatilizing a diluent solvent and the like of the coating solution can also serve as the above heating treatment. When performing the heating treatment, the heating temperature may be preferably 50-150° C. and particularly preferably 70-120° C. The heating time may be preferably 30 seconds to 10 minutes and particularly preferably 50 seconds to 2 minutes. If necessary, an aging period may be provided after the heating treatment at an ordinary temperature (e.g. 23° C. and 50% RH) for one to two weeks. When the acrylic-based pressure sensitive adhesive contains a (meth)acrylic ester polymer having a reactive functional group and a crosslinker, the heating treatment allows a structure to be formed in which the (meth)acrylic ester polymer is crosslinked by the crosslinker.

When the pressure sensitive adhesive layer 13 is formed using a silicone-based pressure sensitive adhesive, the release surface of the release sheet 14 may be coated with a coating solution, which is then heated for curing to form the pressure sensitive adhesive layer 13. The coating solution may be obtained, for example, by diluting an addition-type organopolysiloxane and a platinum catalyst and if desired an organopolysiloxane that contains a trifunctional or tetrafunctional siloxane unit, to about 10-60 mass % using a solvent such as methyl ethyl ketone, toluene, ethyl acetate, and xylene. The heating temperature may preferably be about 90-180° C. and the heating time may preferably be about 1-5 minutes Another method of manufacturing the pressure sensitive adhesive sheet 1 according to the present embodiment may include forming the hard coat layer 12 and the pressure sensitive adhesive layer 13 in this order on the base material 11.

<Method of Using Pressure Sensitive Adhesive Sheet>

The pressure sensitive adhesive sheet 1 according to the present embodiment can be used for a battery. In particular, the pressure sensitive adhesive sheet 1 can be used inside a battery.

For example, the pressure sensitive adhesive sheet 1 according to the present embodiment can be used inside a battery to fix two or more conductors in a state in which the two or more conductors are in contact with each other. The volume of at least one of the conductors may be larger than those of other conductors. For example, at least one of the conductors may be in a sheet-like shape while at least another one of the conductors may be in a line-like shape or rod-like shape. In a specific example, the pressure sensitive adhesive sheet 1 can be used in a battery that stores a strip-like laminate of a positive electrode, a separator, and a negative electrode, in order to fix one or more line-like or rod-like electrode lead-out tabs to a sheet-like positive electrode and/or negative electrode. In general, such positive and negative electrodes may be made of a material of metal such as aluminum while the electrode lead-out tabs may be made of a material of metal such as aluminum and copper.

The pressure sensitive adhesive sheet 1 according to the present embodiment can be used in a state in which it is in contact with an electrolyte solution in a battery that encloses the electrolyte solution. The electrolyte solution may be an aqueous electrolyte solution that uses water as a main solvent or may also be a nonaqueous electrolyte solution that does not use water as a main solvent. Examples of the nonaqueous electrolyte solution include an electrolyte solution used in a lithium-ion battery. Preferred examples of the electrolyte solution include those in which a lithium salt as the solute is dissolved in a mixed solvent of a cyclic carbonate and a lower chain carbonate. Examples of the lithium salt to be used include fluorine-based complex salts, such as lithium hexafluorophosphate (LiPF$_6$) and lithium borofluoride (LiBF$_4$), and LiN(SO$_2$Rf)$_2$.LiC(SO$_2$Rf)$_3$ (where Rf=CF$_3$, C$_2$F$_5$). Examples of the cyclic carbonate to be used include ethylene carbonate and propylene carbonate. Preferred examples of the lower chain carbonate include dimethyl carbonate, ethyl methyl carbonate, and diethyl carbonate. Examples of other electrolyte solutions include zinc sulfate aqueous solution, copper sulfate aqueous solution, dilute sulfuric acid aqueous solution, ammonium chloride aqueous solution, and zinc chloride aqueous solution as aqueous electrolyte solutions.

The pressure sensitive adhesive sheet 1 according to the present embodiment is provided with the hard coat layer 12 between the base material 11 and the pressure sensitive adhesive layer 13, and the amount of electrolyte solution infiltrating into the pressure sensitive adhesive layer 13 is thus reduced. This can well maintain the adhesive strength of the pressure sensitive adhesive layer 13 and suppress the delamination of the pressure sensitive adhesive sheet 1 from an adherend. Deterioration of performance due to the pressure sensitive adhesive sheet is thereby suppressed in a battery for which the pressure sensitive adhesive sheet 1 is used. Moreover, the amount of electrolyte solution infiltrating into the pressure sensitive adhesive layer 13 is reduced to reduce the amount of components of the pressure sensitive adhesive layer 13 which dissolve into the electrolyte solution. This suppresses the erroneous operation, thermal runaway, and short circuit of a battery for which the pressure sensitive adhesive sheet 1 is used. Furthermore, a battery for which the pressure sensitive adhesive sheet 1 according to the present embodiment is used is expected to have excellent temperature stability even under large-current conditions.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the pressure sensitive adhesive sheet 1, the release sheet 14 may be omitted. In an embodiment, the pressure sensitive adhesive sheet 1 may be provided with one or more other layers between the base material 11 and the hard coat layer 12.

EXAMPLES

Hereinafter, the present invention will be described further specifically with reference to examples, etc., but the scope of the present invention is not limited to these examples, etc.

Example 1

1. Formation of Hard Coat Layer on Base Material

A coating liquid for hard coat layer was prepared through mixing 40 mass parts of dipentaerythritol hexaacrylate (a material of which the glass-transition point is not observed after curing) as an active energy ray-curable component, 5 mass parts of hydroxycyclohexyl phenyl ketone as a photopolymerization initiator, and 60 mass parts (solid content equivalent, here and hereinafter) of an organosilica sol (available from Nissan Chemical Industries, Ltd., trade name "MEK-ST," average particle diameter of 30 nm) as an inorganic filler and diluting them with methyl ethyl ketone. The solid content concentration of the coating liquid for hard coat layer was 20 mass %.

One surface of a polyimide film (available from DU PONT-TORAY CO., LTD., trade name "Kapton 100H," thickness of 25 μm, flame retardation level V-0 of UL94 standard) as a base material was coated with the above coating liquid using a knife coater and the coating liquid was then dried at 70° C. for 1 minute. Subsequently, the coating film was irradiated with ultraviolet rays (illuminance of 230 mW/cm$^2$, light amount of 510 mJ/cm$^2$) to cure the coating film. A first laminate was thus obtained in which a hard coat layer having a thickness of 2 μm was formed on one surface of the base material.

2. Formation of Pressure Sensitive Adhesive Layer on Release Sheet

A (meth)acrylic ester polymer was prepared by copolymerizing 77 mass parts of butyl acrylate, 20 mass parts of methyl acrylate, and 3 mass parts of acrylic acid. The molecular weight of this polymer was measured using gel permeation chromatography (GPC), which will be described later. The weight-average molecular weight (Mw) was 900,000. Then, a coating liquid for pressure sensitive adhesive layer was prepared through mixing 100 mass parts of the (meth)acrylic ester polymer, 2.2 mass parts of trimethylolpropane-modified tolylene diisocyanate (available from TOYOCHEM CO., LTD., trade name "BHS8515") as a crosslinker, and 0.3 mass parts of aluminum tris(acetylacetonate) (available from Soken Chemical & Engineering Co., Ltd., trade name "M-5A") as a crosslinker and diluting them with methyl ethyl ketone. The solid content concentration of the coating liquid for pressure sensitive adhesive layer was 20 mass %.

A release sheet (available from LINTEC Corporation, trade name "PET251130") was prepared in which one surface of a polyethylene terephthalate film was subjected to release treatment using a silicone-based release agent. The release-treated surface of the release sheet was coated with the obtained coating liquid using a knife coater and the coating liquid was then heat-treated at 120° C. for 1 minute. A second laminate was thus obtained in which a pressure sensitive adhesive layer composed of the acrylic-based pressure sensitive adhesive and having a thickness of 5 μm was laminated on the release-treated surface of the release sheet.

3. Production of Pressure Sensitive Adhesive Sheet

The surface at the hard coat layer side of the first laminate produced as the above and the surface at the pressure sensitive adhesive layer side of the second laminate produced as the above were attached to each other, and a pressure sensitive adhesive sheet was thus obtained.

Example 2

A coating liquid for hard coat layer was prepared through mixing 25 mass parts of dipentaerythritol hexaacrylate, 1 mass part of hydroxycyclohexyl phenyl ketone as a photopolymerization initiator, 20 mass parts of a polyamideimide resin (available from "TOYOBO CO., LTD., trade name "VYLOMAX CHX02"), and 60 mass parts of an organosilica sol (available from Nissan Chemical Industries, Ltd., trade name "MEK-ST") as an inorganic filler and diluting them with methyl ethyl ketone. The solid content concentration of the coating liquid for hard coat layer was 20 mass %. A pressure sensitive adhesive sheet was manufactured in the same manner as in Example 1 except that the coating liquid for hard coat layer was used.

Example 3

A coating liquid for pressure sensitive adhesive layer was prepared through mixing 100 mass parts of a silicone-based pressure sensitive adhesive (available from Dow Corning Toray Co., Ltd., trade name "SD-4584") and 0.5 mass parts of a catalyst (available from Dow Corning Toray Co., Ltd., trade name "CAT-SRX-212") and diluting them with methyl ethyl ketone. The solid content concentration of the coating liquid for pressure sensitive adhesive layer was 20 mass %. A pressure sensitive adhesive sheet was manufactured in the same manner as in Example 1 except that the coating liquid for pressure sensitive adhesive layer and a release sheet (available from LINTEC Corporation, trade name "PET50FD") obtained by release-treating one surface of a polyethylene terephthalate film using a fluorine-based release agent were used.

Example 4

A coating liquid for pressure sensitive adhesive layer was prepared through mixing 100 mass parts of polyisobutylene (available from JAPAN BUTYL Co. Ltd., trade name "Exxon Butyl 268"), 5 mass parts of a methacryloyl group-containing polyisoprene rubber (available from KURARAY CO., LTD., trade name "UC-203"), and 20 mass parts of an aliphatic-based petroleum resin (available from Zeon Corporation, trade name "Quintone A100") and diluting them with toluene. The solid content concentration of the coating liquid for pressure sensitive adhesive layer was 20 mass %. A pressure sensitive adhesive sheet was manufactured in the same manner as in Example 1 except that the coating liquid for pressure sensitive adhesive layer was used.

Example 5

A coating liquid for hard coat layer was prepared through mixing 40 mass parts of dipentaerythritol hexaacrylate as an active energy ray-curable component, 5 mass parts of hydroxycyclohexyl phenyl ketone as a photopolymerization initiator, and 60 mass parts of alumina ceramic nanoparticles (available from BYK Japan KK, trade name "NANOBYK-3601") as an inorganic filler and diluting them with methyl ethyl ketone. The solid content concentration of the coating liquid for hard coat layer was 20 mass %. A pressure sensitive adhesive sheet was manufactured in the same manner as in Example 1 except that the coating liquid for hard coat layer was used.

Example 6

A (meth)acrylic ester polymer was prepared by copolymerizing 60 mass parts of butyl acrylate, 20 mass parts of methyl acrylate, and 20 mass parts of acrylic acid. The molecular weight of this polymer was measured using gel permeation chromatography (GPC), which will be described later. The weight-average molecular weight (Mw) was 600,000. A coating liquid for pressure sensitive adhesive layer was prepared through mixing 100 mass parts of the (meth) acrylic ester polymer and 2.2 mass parts of trimethylolpropane-modified tolylene diisocyanate (available from TOYO-CHEM CO., LTD., trade name "BHS8515") as a crosslinker and diluting them with methyl ethyl ketone. The solid content concentration of the coating liquid for pressure sensitive adhesive layer was 20 mass %. A pressure sensitive adhesive sheet was manufactured in the same manner as in Example 1 except that the coating liquid for pressure sensitive adhesive layer was used.

Example 7

A (meth)acrylic ester polymer was prepared by copolymerizing 99 mass parts of butyl acrylate and 1 mass part of 4-hydroxybutyl (meth)acrylate. The molecular weight of this polymer was measured using gel permeation chromatography (GPC), which will be described later. The weight-average molecular weight (Mw) was 1,500,000. A coating liquid for pressure sensitive adhesive layer was prepared through mixing 100 mass parts of the (meth)acrylic ester polymer and 2.2 mass parts of trimethylolpropane-modified tolylene diisocyanate (available from TOYOCHEM CO., LTD., trade name "BHS8515") as a crosslinker and diluting them with methyl ethyl ketone. The solid content concentration of the coating liquid for pressure sensitive adhesive layer was 20 mass %. A pressure sensitive adhesive sheet was manufactured in the same manner as in Example 1 except that the coating liquid for pressure sensitive adhesive layer was used.

Example 8

A coating liquid for hard coat layer was prepared through mixing 40 mass parts of dipentaerythritol hexaacrylate as an active energy ray-curable component, 5 mass parts of hydroxycyclohexyl phenyl ketone as a photopolymerization initiator, and 60 mass parts of reactive silica (silica fine particles having acryloyl groups on the surfaces, average particle diameter of 15 nm before surface modification of silica fine particles) as an inorganic filler and diluting them with methyl ethyl ketone. The solid content concentration of the coating liquid for hard coat layer was 20 mass %. A pressure sensitive adhesive sheet was manufactured in the same manner as in Example 1 except that the coating liquid for hard coat layer was used.

Comparative Example 1

A pressure sensitive adhesive sheet was manufactured in the same manner as in Example 1 except that a polyimide film (available from DU PONT-TORAY CO., LTD., trade name "Kapton 100H," thickness of 25 μm) as a base material was used as substitute for the first laminate and one surface of the base film and the surface at the pressure sensitive layer side of the second laminate were attached to each other.

Exemplary Test 1

Measurement of Adhesive Strength Before and After Immersion in Electrolyte Solvent The adhesive strength of the pressure sensitive adhesive sheets was measured in accordance with JIS Z0237: 2009 except the following operation.

The pressure sensitive adhesive sheet obtained in each of the examples or the comparative example was cut into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment of 23° C. and 50% RH and they were then left untouched under the same environment for 20 minutes. Thereafter, the test piece was peeled off from the above aluminum plate at a peel angle of 180° and a peel speed of 300 mm/min using a universal tensile tester (available from ORIENTEC Co., LTD., "TENSILON UTM-4-100") and the peel strength (N/25 mm) was thus measured. The measured value was employed as the adhesive strength before immersion in the electrolyte solvent. Results are listed in Table 1.

Test pieces obtained in the same manner as the above were each attached to an aluminum plate under the same condition as the above and left untouched for 20 minutes. Thereafter, in a state in which each test piece was attached to the aluminum plate, they were immersed in a prepared liquid as the electrolyte solvent at 100° C. for 6 hours. The prepared liquid was obtained by mixing ethylene carbonate and diethyl carbonate at a mass ratio of 1:1. Subsequently, the test piece was immersed in ethanol to dissolve and remove the attached electrolyte solvent. After the ethanol was wiped off, the test piece was left untouched under an environment of a temperature of 23° C. and a relative humidity of 50% for 3 hours. The peel strength (N/25 mm)

was then measured in the same manner as the above. The measured value was employed as the adhesive strength after immersion in the electrolyte solvent. Results are listed in Table 1.

Exemplary Test 2

Evaluation of Delamination Due to Immersion in Electrolyte Solvent

The pressure sensitive adhesive sheet obtained in each of the examples or the comparative example was cut into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment of 23° C. and 50% RH and they were then left untouched under the same environment for 20 minutes. Thereafter, in a state in which the test piece was attached to the aluminum plate, they were immersed in a prepared liquid as the electrolyte solvent at 100° C. for 6 hours. The prepared liquid was obtained by mixing ethylene carbonate and diethyl carbonate at a mass ratio of 1:1. Then, the presence or absence of delamination of the test piece due to the immersion was visually confirmed, and the maximum length (mm) of a delaminated portion was measured if delamination occurred. Results are listed in Table 1.

Exemplary Test 3

Measurement of Gel Fraction by Immersion in Electrolyte Solvent

In the manufacturing of the pressure sensitive adhesive sheet of each of the examples and comparative example, the surface at the pressure sensitive adhesive layer side of the second laminate was attached to the release-treated surface of another release sheet (available from LINTEC Corporation, trade name "PET251130") in which one surface of a polyethylene terephthalate film was subjected to release treatment using a silicone-based release agent. A sheet for measurement was thus obtained comprising the pressure sensitive adhesive layer alone, of which both surfaces were protected by the release sheets.

The obtained sheet for measurement was cut into a size of 80 mm×80 mm and the release sheets protecting both surfaces of the pressure sensitive adhesive layer were removed. The pressure sensitive adhesive layer was wrapped with a polyester mesh (mesh size of 200) and the total mass was weighed using a precision balance. The mass of the pressure sensitive adhesive alone was calculated by subtracting the mass of the above mesh alone from the total mass. The calculated mass is represented by M1. Then, the pressure sensitive adhesive wrapped with the above polyester mesh was immersed in a prepared liquid as the electrolyte solvent at 60° C. for 24 hours. The prepared liquid was obtained by mixing ethylene carbonate and diethyl carbonate at a mass ratio of 1:1. Thereafter, the pressure sensitive adhesive layer was taken out and once immersed in ethanol to dissolve and remove the attached electrolyte solvent, then air-dried for 24 hours under an environment of a temperature of 23° C. and a relative humidity of 50%, and further dried in an oven at 80° C. for 12 hours. After drying, the mass was weighed using a precision balance and the mass of the pressure sensitive adhesive alone was calculated by subtracting the mass of the above mesh alone. The calculated mass is represented by M2. The gel fraction (%) was calculated from the calculation formula of (M2/M1)× 100. Results are listed in Table 1.

Exemplary Test 4

Measurement of Storage Elastic Modulus

The release sheet was removed from the second laminate obtained in each of the examples or the comparative example to expose the pressure sensitive adhesive layer. A plurality of such pressure sensitive adhesive layers was laminated so as to have a thickness of 0.6 mm. A cylindrical body having a diameter of 8 mm (height of 0.6 mm) was punched out from the obtained laminate of the pressure sensitive adhesive layers and this was employed as a sample.

The storage elastic modulus (MPa) of the above sample was measured by a torsional shear testing method under the following condition in accordance with JIS K7244-6 using a viscoelasticity measuring apparatus (available from Physica, MCR300). Measurement results are listed in Table 1.

Measurement frequency: 1 Hz
Measurement temperature: 120° C.

Exemplary Test 5

Evaluation of Pencil Hardness

For the hard coat layer of the first laminate obtained when manufacturing the pressure sensitive adhesive sheet of each of the examples and comparative example, the pencil hardness was measured in accordance with JIS K5600-5-4. A pencil scratch hardness tester (available from YASUDA SEIKI SEISAKUSHO, LTD., trade name "No. 553-M") was used for the measurement and the scratch speed was 1 mm/sec. Results are listed in Table 1.

TABLE 1

|  |  | Example 1 | Example 2 | Example 3 | Example 4 | Example 5 | Example 6 | Example 7 | Example 8 | Comparative Example 1 |
|---|---|---|---|---|---|---|---|---|---|---|
| Adhesive force (N/25 mm) | Before immersion in solvent | 5 | 5 | 10 | 4 | 5 | 7 | 4 | 5 | 5 |
|  | After immersion in solvent | 1 | 2 | 8 | 4 | 1 | 0.5 | 1 | 3 | 0.04 |
| Delamination | Presence or absence | Present | Present | Absent | Absent | Present | Present | Present | Present | Present |
|  | Maximum length (mm) | 20 | 15 | 0 | 0 | 20 | 50 | 15 | 10 | 150 |
| Gel fraction (%) |  | 70 | 70 | 80 | 100 | 70 | 55 | 75 | 70 | 70 |
| Storage elastic modulus at 120° C. (kPa) |  | 72 | 72 | 80 | 93 | 72 | 26 | 58 | 72 | 72 |
| Pencil hardness of hard coat layer |  | HB | HB | HB | HB | HB | HB | HB | H | 2B |

As apparent from Table 1, the pressure sensitive adhesive sheets of the examples exhibit higher adhesive strength after immersion in the electrolyte solution and the delamination amount was smaller as compared with the pressure sensitive adhesive sheet of the comparative example.

INDUSTRIAL APPLICABILITY

The pressure sensitive adhesive sheet of the present invention is suitable as a pressure sensitive adhesive sheet that is used inside a battery in a state of being in contact with an electrolyte solution.

DESCRIPTION OF REFERENCE NUMERALS

1 . . . Pressure sensitive adhesive sheet
11 . . . Base material
12 . . . Hard coat layer
13 . . . Pressure sensitive adhesive layer
14 . . . Release sheet

The invention claimed is:

1. A battery containing a pressure sensitive adhesive sheet, the pressure sensitive adhesive sheet comprising in following order:
a base material layer;
a hard coat layer provided at one side of the base material layer, the hard coat layer having pencil hardness of HB or more as measured in accordance with JIS K5600-5-4; and
a pressure sensitive adhesive layer provided at a side of the hard coat layer opposite to the base material layer,
wherein after the pressure sensitive adhesive sheet attached to an aluminum plate is immersed in a solvent of a nonaqueous electrolyte solution at 100° C. for 6 hours, adhesive strength of the pressure sensitive adhesive sheet to the aluminum plate is 0.1-15 N/25 mm.

2. The battery as recited in claim 1, wherein the base material layer has flame retardancy that satisfies flame retardancy level V-0 of UL94 standard.

3. The battery as recited in claim 1, wherein the pressure sensitive adhesive layer has storage elastic modulus at 120° C. of 1-500 kPa.

4. A pressure sensitive adhesive sheet for use in a battery, comprising in the following order:
a base material layer;
a hard coat layer provided at one side of the base material layer, the hard coat layer having a pencil hardness of HB or more as measured in accordance with JIS K5600-5-4; and
a pressure sensitive adhesive layer provided at a side of the hard coat layer opposite to the base material layer,
wherein after a pressure sensitive adhesive that constitutes the pressure sensitive adhesive layer is immersed in a solvent of a nonaqueous electrolyte solution at 60° C. for 24 hours, the pressure sensitive adhesive has a gel fraction of 20-100%.

5. The pressure sensitive adhesive sheet as recited in claim 4, wherein the base material layer has flame retardancy that satisfies flame retardancy level V-0 of UL94 standard.

6. The pressure sensitive adhesive sheet as recited in claim 4, wherein after the pressure sensitive adhesive sheet attached to an aluminum plate is immersed in a solvent of a nonaqueous electrolyte solution at 100° C. for 6 hours, adhesive strength of the pressure sensitive adhesive sheet to the aluminum plate is 0.1-15 N/25 mm.

7. The pressure sensitive adhesive sheet as recited in claim 4, wherein the pressure sensitive adhesive layer has storage elastic modulus at 120° C. of 1-500 kPa.

8. The battery as recited in claim 1, wherein after a pressure sensitive adhesive that constitutes the pressure sensitive adhesive layer is immersed in a solvent of a the nonaqueous electrolyte solution at 60° C. for 24 hours, the pressure sensitive adhesive has a gel fraction of 20-100%.

9. The battery as recited in claim 1 containing a nonaqueous electrolyte solution in contact with the pressure sensitive adhesive layer.

10. A battery containing a nonaqueous electrolyte solution in contact with a pressure sensitive adhesive sheet, the pressure sensitive adhesive sheet comprising in the following order:
a base material layer;
a hard coat layer provided at one side of the base material layer, the hard coat layer having a pencil hardness of HB or more as measured in accordance with JIS K5600-5-4; and
a pressure sensitive adhesive layer provided at a side of the hard coat layer opposite to the base material layer,
wherein after the pressure sensitive adhesive sheet attached to an aluminum plate is immersed in a solvent of a nonaqueous electrolyte solution at 100° C. for 6 hours, adhesive strength of the pressure sensitive adhesive sheet to the aluminum plate is 0.1-15 N/25 mm.

11. The battery as recited in claim 10, wherein the base material layer has flame retardancy that satisfies flame retardancy level V-0 of UL94 standard.

12. The battery as recited in claim 10, wherein after a pressure sensitive adhesive that constitutes the pressure sensitive adhesive layer is immersed in a solvent of the nonaqueous electrolyte solution at 60° C. for 24 hours, the pressure sensitive adhesive has a gel fraction of 20-100%.

13. The battery as recited in claim 10, wherein the pressure sensitive adhesive layer has storage elastic modulus at 120° C. of 1-500 kPa.

* * * * *